April 26, 1932. C. C. WIESER 1,855,700
CUTTING INDICATOR ATTACHMENT FOR LATHES
Filed March 17, 1930
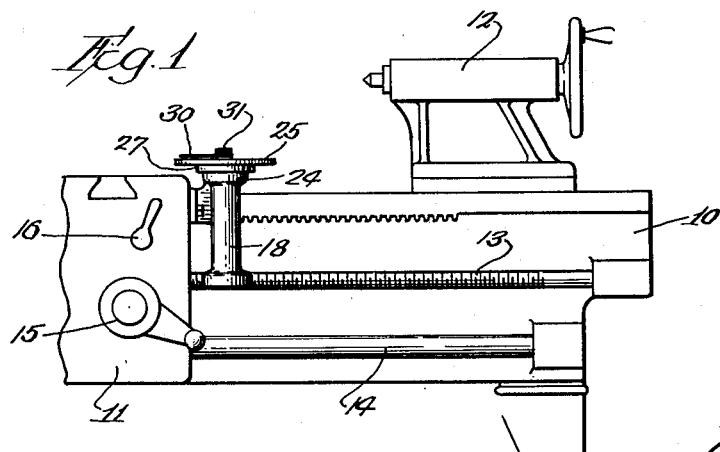
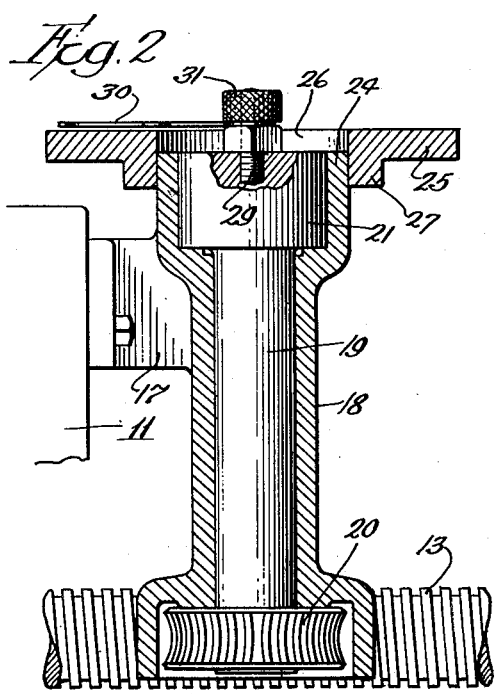
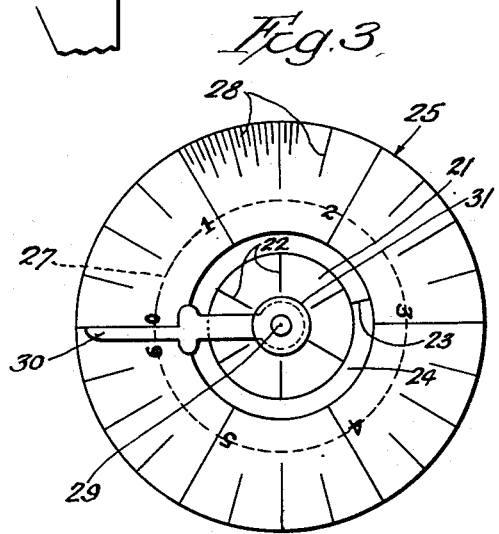
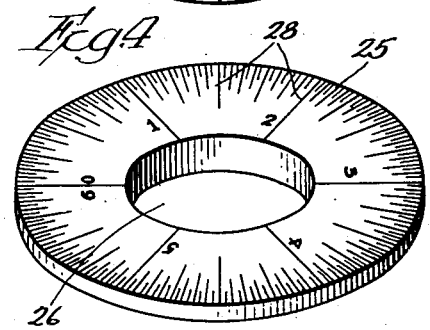
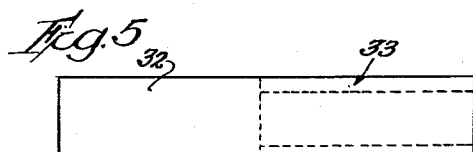
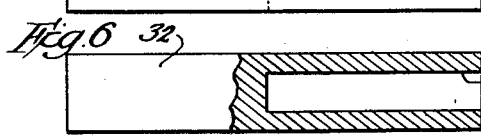
Inventor:
Clarence C. Wieser Patented Apr. 26, 1932

1,855,700

UNITED STATES PATENT OFFICE

CLARENCE C. WIESER, OF CHICAGO, ILLINOIS

CUTTING INDICATOR ATTACHMENT FOR LATHES

Application filed March 17, 1930. Serial No. 436,541.

This invention relates to improvements in indicator attachment for lathes for indicating the length of the surface cut off and of the depth of a bore made longitudinally in the work through one end thereof.

Heretofore with the ordinary lathe it is impossible to determine just exactly when the cutter has reached the limit of the length of the cut, as the length of the cut it is desired to make has to be determined by the eye of the operator, and at the present time it is necessary to withdraw the carriage or the cutter and move them back to permit the use of measuring instruments on the work to determine just what length the surface has been cut off of the work.

In other instances when it is desired to bore or cut an opening into the end of the work, it is impossible to determine when the cut has reached the limit of the depth of the bore which it is desired to make, with the result that it is necessary to withdraw the cutter from time to time and insert a measuring instrument into the bore or opening to ascertain to what extent the cut has been made.

The repeated withdrawing and resetting of the tool and of the measuring of the work from time to time necessitates considerable time and labor and results not only in decreased production but increase in the cost thereof.

It is one of the objects of the present invention to overcome these difficulties and objections and to provide an improved indicator attachment for lathes by means of the use of which it will not be necessary to withdraw the tool, or measure the work from time to time, as the indicator will indicate to the operator the exact extent of travel the cutting tool has made with respect to the work and the exact length of cut at any stage in the cutting operation.

A further object is to provide an improved indicator of this character which may be readily attached to the indicator gage of the ordinary screw cutting machine, and which will not interfere with the operation of the screw cutting gage, and at the same time the attachment is adapted to be set so as to indicate on the gage any desired point of indication at the commencement of the cutting operation, thereby obviating the necessity of imposing upon the operator the task of calculating or guessing the point on the gage or indicator from which the measurement of the work must be started.

A further object is to provide an improved device of this character which will be of a simple, durable and compact construction, readily attached and removed, and which will be effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is an elevation of a portion of an ordinary lathe having an indicator gage constructed in accordance with the principles of this invention attached thereto.

Figure 2 is an enlarged detail view, partly in vertical section and partly in elevation, of the indicator gage.

Figure 3 is a top plan view of the gage.

Figure 4 is a detail perspective view of one of the gage members detached.

Figures 5 and 6 indicate the type of work with which the use of this indicator gage is particularly adapted.

Referring more particularly to the drawings the numeral 10 designates the bed of a lathe, 11 the carriage which carries the cutting tool, 12 the tail stock, 13 the lead screw. 14 an operating shaft, 15 and 16 control members for the carriage 11, all of which are of the ordinary and well known construction.

Connected with the carriage 11 in any suitable manner, such as by means of a bracket 17, is a casing 18 in which a vertical shaft 19 is arranged. Connected to one end of the shaft 19 is a gear 20 which meshes with the lead screw 13, and arranged on the top of the upper portion 21 of the shaft 19 are graduations or indications 22 which co-operate with a graduation or indication 23 on the upper surface of the portion 24 of the casing 18. This much of the construction constitutes the ordinary screw indicating gage which, by the rotation of the shaft 19 through the co-operation of the lead screw 13 and gear 20, in the ordinary manner, causes the graduations or indications 22 to be rotated with respect to the graduations or indications 23 and thereby indicate the position in which the carriage 11 must be placed for screw threaded cutting operations.

It is necessary, however, in these screw threaded operations for the operator to determine and calculate or cause the gage to be set, by guesswork, as it is always necessary when the carriage is returned to a starting position to accurately position the tool with respect to the portion of the thread already cut, and therefore the ordinary screw thread indicator is not adapted for the purposes to which the present invention is adapted.

The present invention consists primarily of a disc 25 having an opening 26 therein and a flange 27 encompassing the opening. The upper surface of the disc is provided with graduations 28, suitably arranged, any number of which graduations may be provided. This disc is placed upon the top of the casing 18 and is held there in any suitable manner such as by means of a drive fit or any other suitable way, adapting the same to be readily applied and readily removed when desired. The top surface of the disc 25 is preferably spaced above the top surface of the portion 21 of the shaft 19 and of the portion 24 of the casing 18 so as to form a recess for the reception of chips or foreign particles so as not to interfere with the operation of the gage.

Connected to the shaft 19 in any suitable manner is a post 29 which extends above the top of the disc 25. An indicator or pointer 30 is connected with the post 29 by being sleeved thereover and another collar 31 is threaded upon the post so as to secure the pointer 30 for rotation with the shaft 19. This pointer 30 moves over the face of the disc 25 and co-operates with the graduations 28 thereon.

As the carriage 11 is advanced and the shaft 19 is rotated by the co-operation of the gear 20 and the lead screw 13, it will be manifest that the extent of movement of the carriage 11 and of the cutting tool will be indicated upon the disc or dial 25 and it will therefore not be necessary for the operator to stop the machine, retract the carriage 11 or measure the extent of the surface of the bore which is being made in the work.

When the carriage is retracted and another portion of the surface of the work 32 is removed as at 33, it will not be necessary for the operator to calculate from any starting point of the indicator 30 with the dial 25, as the operator may simply loosen the nut or collar 31 and reset the pointer or indicator 30 with respect to the graduations 28 on the dial 25, in the event that when the carriage is retracted the indicator 30 does not start at the proper point on the dial 25.

Thus it will be seen that the surface cut 33 or the bore 34 of the work may be readily measured during the operation or advancement of the carriage 11 and it will not be necessary for the operator to measure the work by other implements or lose any time in retracting the carriage for measuring purposes.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination, a thread indicator for screw cutting lathes embodying a dial fixed against rotary movement and a rotatable indicator co-operating therewith, means connected with said thread indicator for indicating the extent of the cutting travel of the cutting tool of the lathe, said means embodying an independent supplemental dial adapted to be connected with said fixed dial, and a pointer co-operating with the supplemental dial and connected with the said rotatable indicator and for adjustment with respect thereto whereby the initial position of the supplemental dial and said pointer may be varied independent of the elements of the thread indicator.

2. In combination, a thread indicator for screw cutting lathes, embodying a dial fixed against rotary movement and a rotatable indicator co-operating therewith, means connected with said thread indicator for indicating the extent of the cutting travel of the cutting tool of the lathe, said means embodying an independent supplemental dial adapted to be connected with said fixed dial, a pointer co-operating with said supplemental dial, and means for securing the pointer to the rotatable element of said thread indicator, the last said means adapting the said pointer to be set to any desired position with respect to the supplemental dial at will.

3. In combination, a thread indicator for screw cutting lathes embodying a dial fixed against rotary movement, and a rotatable indicator co-operating therewith, means connected with said thread indicator for indicating the extent of the cutting travel of the cutting tool of the lathe, said means embodying an independent annular supplemental dial adapted to be telescoped over the said fixed dial and surround said rotatable indicator, and a pointer co-operating with the supplemental dial and connected with said rotatable indicator through the opening in said supplemental dial for adjustment with respect to the supplemental dial and rotatable indicator, whereby the initial position of the said pointer with respect to the supplemental dial may be varied independent of the thread indicator.

In testimony whereof I have signed my name to this specification, on this 11th day of March, A. D. 1930.

CLARENCE C. WIESER.